(12) United States Patent
Smith et al.

(10) Patent No.: US 10,156,134 B2
(45) Date of Patent: Dec. 18, 2018

(54) METHOD AND APPARATUS FOR PASSIVE DETECTION OF NEAR-SURFACE HUMAN-SCALE UNDERGROUND ANOMALIES USING EARTH FIELD MEASUREMENTS

(71) Applicant: Terra Response LLC, Bruceton Mills, WV (US)

(72) Inventors: James E. Smith, Bruceton Mills, WV (US); Franz A. Pertl, Morgantown, WV (US); Roy S. Nutter, Morgantown, WV (US); Andrew D. Lowery, Morgantown, WV (US)

(73) Assignee: Terra Response LLC, Bruceton Mills, WV (US)

( * ) Notice: Subject to any disclaimer, the term of this patent is extended or adjusted under 35 U.S.C. 154(b) by 0 days.

(21) Appl. No.: 15/666,478

(22) Filed: Aug. 1, 2017

(65) Prior Publication Data

US 2017/0356285 A1    Dec. 14, 2017

Related U.S. Application Data

(63) Continuation of application No. 14/213,704, filed on Mar. 14, 2014, now Pat. No. 9,719,343.
(Continued)

(51) Int. Cl.
*E21B 47/09* (2012.01)
*G01V 3/08* (2006.01)
*G01V 3/12* (2006.01)

(52) U.S. Cl.
CPC .............. *E21B 47/09* (2013.01); *G01V 3/08* (2013.01); *G01V 3/081* (2013.01); *G01V 3/12* (2013.01)

(58) Field of Classification Search
CPC . G01V 3/08; G01V 3/081; G01V 3/15; G01V 3/12; E21B 47/02224; E21B 47/09
(Continued)

(56) References Cited

U.S. PATENT DOCUMENTS

| 4,004,212 A | * | 1/1977 | Wortman | G01V 3/12 |
| | | | | 250/366 |
| 4,021,725 A | * | 5/1977 | Kirkland | F41H 11/16 |
| | | | | 324/326 |

(Continued)

*Primary Examiner* — Jermele M Hollington
*Assistant Examiner* — Christopher McAndrew
(74) *Attorney, Agent, or Firm* — McDonell Boehnen Hulbert & Berghoff LLP

(57) ABSTRACT

A method for detecting a subsurface anomaly at a near-surface depth, comprises positioning an electromagnetic sensor configured to measure a component of a planetary electromagnetic field such that the electromagnetic sensor is suspended just above a ground-air barrier and does not contact a ground surface; selecting an electromagnetic frequency by calculating a function of properties of the ground that include relative permittivity, relative permeability, and resistivity; moving the electromagnetic sensor over the surface of the ground; repeatedly measuring intensity of the component of the planetary electromagnetic field at the frequency to obtain a set of measurements; and comparing at least a first measurement in the set of measurements to at least a second measurement in the set of measurements to identify a change in the intensity of the component of the planetary electromagnetic field that is indicative of a presence of a subsurface anomaly.

6 Claims, 6 Drawing Sheets

Related U.S. Application Data

(60) Provisional application No. 61/790,937, filed on Mar. 15, 2013.

(58) Field of Classification Search
USPC .......................................................... 324/326
See application file for complete search history.

(56) References Cited

U.S. PATENT DOCUMENTS

| | | | | |
|---|---|---|---|---|
| 4,774,842 A * | 10/1988 | Kollar | ................. | G01N 29/265 73/621 |
| 4,866,276 A * | 9/1989 | Leavens | ................ | G01N 25/72 250/341.6 |
| 5,148,110 A * | 9/1992 | Helms | ..................... | G01V 1/001 324/323 |
| 6,411,095 B1 * | 6/2002 | Chin | ........................ | G01V 3/06 324/326 |
| 6,998,854 B2 * | 2/2006 | Yamagishi | .............. | F41H 11/12 324/326 |
| 7,777,496 B2 * | 8/2010 | Evans | .................... | G01N 21/84 324/534 |
| 2002/0075001 A1 * | 6/2002 | Goodman | ................ | G01V 3/15 324/326 |
| 2003/0184300 A1 * | 10/2003 | Bigelow | ................ | G01V 3/081 324/326 |
| 2005/0140372 A1 * | 6/2005 | Wright | ................... | G01V 15/00 324/326 |
| 2006/0214665 A1 * | 9/2006 | Matsuo | .................... | G01V 3/08 324/345 |
| 2007/0040558 A1 * | 2/2007 | Overby | ..................... | F16L 1/11 324/326 |

\* cited by examiner

METHOD AND APPARATUS FOR PASSIVE DETECTION OF NEAR-SURFACE HUMAN-SCALE UNDERGROUND ANOMALIES USING EARTH FIELD MEASUREMENTS

RELATED APPLICATIONS

This application claims the benefit of U.S. Provisional Application 61/790,937, entitled Detection of Underground Structures Using Earth Field Measurements, filed on Mar. 15, 2013, and incorporated by reference as if fully rewritten herein.

FIELD

This application relates to passive detection of human-scale underground structures at near-surface depths using earth field measurements.

BACKGROUND

It is often desirable to sense the location of subsurface objects from outside of the surface of the material in which it is encased (i.e. an object buried underground). For example, sensing the presence of human-scale subsurface objects (both metallic and non-metallic) at relatively near-surface depths (i.e., between zero and 30 meters) can save time, costly explorative excavation, and avoid possible damage to subsurface objects through unguided excavation. Dangers related to digging up objects, such as explosive land mines or gas utility lines, do not have to be contended with or can be reduced if remote sensing from the surface locates the object prior to excavation.

A number of methods have been developed to locate subsurface objects. Subsurface objects, which can be referred to as anomalies, may have various compositions and also include an air pocket or any void or volume uniquely different than the surrounding homogeneous or predictably non-homogeneous material. Metallic objects can be found relatively easily with devices such as metal detectors and through a host of other technologies, such as Ground Penetrating Radar (GPR). It is, however, much more challenging to find non-metallic subsurface objects. The invention described herein is a passive method and apparatus for detecting both metallic and non-metallic subsurface objects, voids and other anomalies using the natural electromagnetic signal emanating from Earth's interior.

The Earth's interior is a highly dynamic structure comprised of multiple layers with a fluid behavior. As the Earth rotates, portions of this fluid move at different velocities and directions. This motion (as well as other factors including lightning, solar wind and flares, etc.) generate low level electromagnetic signals, which then travel outward and pass through the Earth's surface. One example of this phenomena is the well-known core-dynamo effect that creates the quasi-steady state geomagnetic field within the planet. Heating, conduction, and swirling of molten rock can also produce mechanical and electrical signals that travel towards the surface. As these signals travel towards the Earth's surface, they will be affected by the material through which they travel. This effect may show up as variations in signal strength, signal phase, frequency, etc. As the composition of the material varies, so will its effects on the signal passing through it. By monitoring, over an area, the signals emanating from below the Earth's surface, material variations can be detected. This effect can be employed and adapted to locating subsurface objects, voids or other anomalies.

One method of detecting underground structures and other anomalies is audio magneto tellurics (AMT), which monitors AC-signals in the audio frequency range to discover extremely large-scale geological structures. These structures, referred to herein as being of geologic scale, include, by way of example, layers of mineral deposits, rock formations, or other natural resources (such as, for example, coal seams). AMT and other known techniques may not be effective for detecting subsurface objects on smaller scales, at higher resolutions, or at shallower depths.

Another method for detecting underground structures and other anomalies is passive magneto tellurics, which relies on natural, lightening-driven atmospheric noise signals, such as lightening and magnetosphere activities. U.S. Pat. Nos. 4,507,611, 4,825,165 and 5,148,110 to Helms, et al., which are incorporated herein by reference in their entireties, disclose such and other methods for detecting subsurface anomalies. U.S. Pat. No. 6,414,492 to Myers, describes another method for detecting geophysical discontinuities in the Earth by measuring the electrical component of the Earth's electromagnetic field at frequencies below 5 kHz.

These identified methods are capable, to varying degrees, of detecting large, or geologic-scale anomalies at significant sub-surface depths. For example, passive magneto tellurics can detect geological-scale anomalies starting at depths from a few tens of meters to many kilometers, but lacks the resolution to detect small, human-scale objects. Similarly, the passive method disclosed in U.S. Patent No. 5,414,492 can detect geologic-scale anomalies at depths greater than 22.5 meters. The identified methods are not, however, capable of detecting human-scale anomalies or detecting both metallic and non-metallic anomalies at more shallow, near-surface depths (i.e., between zero and 30 meters). For example, none of these methods is sufficiently capable of detecting human-scale anomalies, such as plastic pipes, storage tanks, land mines, or other man-made objects (referred to herein as human-scale objects), buried at near-surface depths. Moreover, the identified methods are capable of generating only relatively low-resolution representations or images of detected subsurface anomalies and have limited capability for determining characteristics of detected subsurface anomalies, such as composition.

Thus, there exists a need in the art for methods and apparatus to passively detect human-scale anomalies, to detect both metallic and non-metallic anomalies, to detect anomalies at near-surface depths, to provide higher resolution representations or images of detected subsurface anomalies, and to determine characteristics of detected subsurface anomalies, such as composition, than what presently is known or available in the art.

SUMMARY OF THE INVENTION

This summary is provided to introduce a selection of concepts in a simplified form that are further described below in the Detailed Description. This Summary is not intended to identify key or essential features of the claimed subject matter, nor is it intended to limit the scope of the claimed subject matter.

In one embodiment, a method for detecting a human-scale, subsurface anomaly at near-surface depths below an area of the Earth's surface comprises suspending a sensor for measuring a component of the Earth's electromagnetic field proximate to the ground-air barrier, measuring the intensity of a component of said field over the area at a frequency of 5 kHz or greater, and comparing the measurements to identify variations in the intensity of the field within the area to detect the presence of a human-scale, subsurface anomaly at a near-surface depth below the first area.

In one embodiment, the presence of an anomaly is detected by comparing measurements of the electric component of the Earth's electromagnetic field at a frequency of 5 kHz or greater. In another embodiment, the presence of an anomaly is detected by comparing measurements of the magnetic component of the Earth's electromagnetic field at a frequency of 5 kHz or greater. The presence of an anomaly also may be detected by comparing measurements of the electric and magnetic components of the Earth's electromagnetic field at a frequency of 5 kHz or greater. In one embodiment, the method may include using variations in an electromagnetic property to determine characteristics of the detected anomaly. Variations in an electromagnetic property may be detected using an array of sensors that may comprise a plurality of sensors, and the location of each measurement may be determined, at least in part, using triangulation.

In one embodiment, a method for determining the depth of a human-scale, subsurface anomaly at near-surface depths below a first area of the Earth's surface comprises suspending a sensor for measuring a component of the Earth's electromagnetic field proximate to the ground-air barrier within the area, measuring the intensity of a component of said field over the area at a plurality of frequencies of 5 kHz or greater, identifying the frequency demonstrating the greatest change in intensity in the presences of the anomaly, calculating the depth of the anomaly using the identified frequency, and determining one or more characteristic of the composition or makeup of said anomaly with a most likely material based on a host of possible materials.

In one embodiment, the depth of an anomaly is determined by measuring the intensity of the electric component of the Earth's electromagnetic field at a plurality of frequencies of 5 kHz or greater. In another embodiment, the depth of an anomaly is determined by measuring the intensity of the magnetic component of the Earth's electromagnetic field at a plurality of frequencies of 5 kHz or greater. In yet another embodiment, the depth of an anomaly is determined by measuring the intensity of the electric and magnetic components of the Earth's electromagnetic field at a plurality of frequencies of 5 kHz or greater. In one embodiment, the method may include using variations in an electromagnetic property to determine characteristics, such as size, shape and material composition, of the detected anomaly. Variations in an electromagnetic property may be detected using an array of sensors that may comprise a plurality of sensors, and the location of each measurement may be determined, at least in part, using triangulation.

Another embodiment is an apparatus for detecting human-scale objects below the surface of the Earth at near-surface depths that comprises a sensor for measuring a component of the Earth's electromagnetic field at frequencies greater than 5 kHz, a frequency-selective circuit, an amplifier, and a recording device. In one embodiment, the sensor is capable of measuring the electric component of the Earth's electromagnetic field at a frequency of 5 kHz or greater, and in another embodiment, the sensor is capable of measuring the magnetic component of the Earth's electromagnetic field at a frequency of 5 kHz or greater. In an alternate embodiment, the sensor is capable of measuring the electric and magnetic components of the Earth's electromagnetic field at a frequency of 5 kHz or greater. One embodiment further includes a receiver for determining the location of each measurement using triangulation, or other means for determining position.

DETAILED DESCRIPTION OF THE INVENTION

Reference will now be made in detail to exemplary embodiments of the present invention, examples of which are illustrated in the accompanying figures. Other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
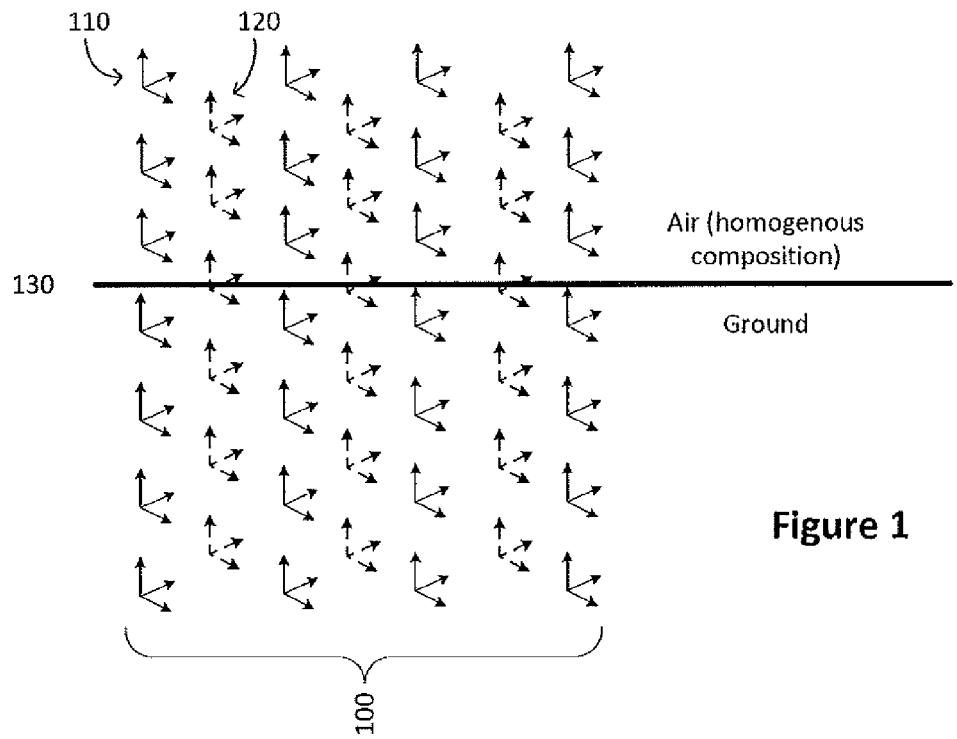
FIG. 1 illustrates the typical electric and magnetic field radiating from the Earth.

Because of its properties of an electromagnetic resonator, the Earth has time-varying electric and magnetic fields. As shown in FIG. 1, the Earth's electromagnetic field 100 includes electric field component 110 and magnetic field component 120, both of which has three components, one in the x-, the y-, and the z-directions. Typically, all three components will travel through the Earth, and penetrate the ground-air barrier 130. However, because electric fields tend to radiate radially from the Earth (as with every spherical object), the z-component of electric field 110 will ordinarily be the strongest by orders of magnitude.

Figure 2:
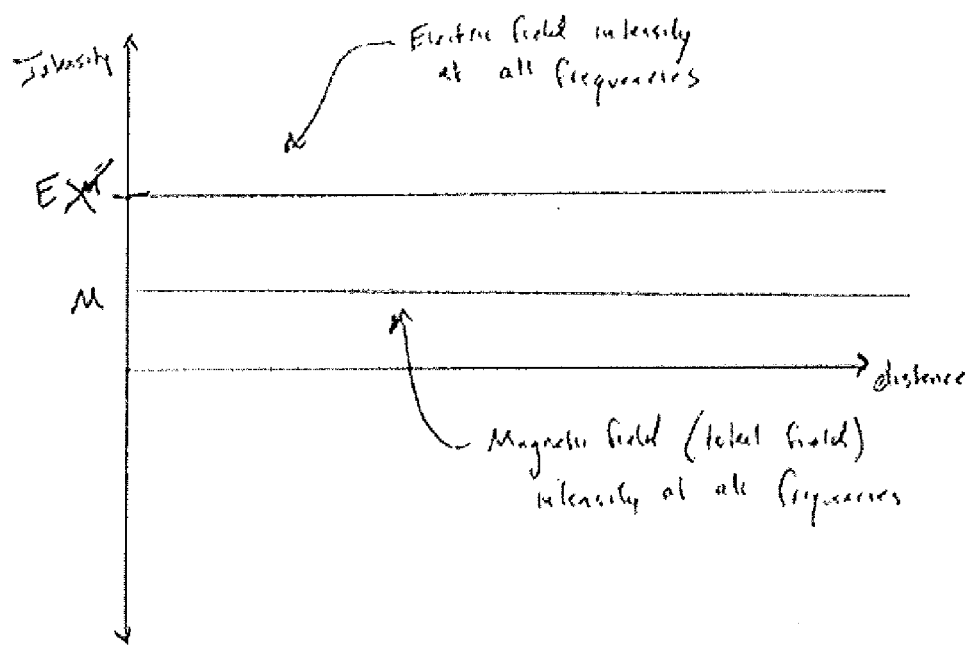
FIG. 2 illustrate the difference in intensity versus position for typical electromagnetic fields radiating from the Earth.

On a clear day, the Earth's electric field has an approximate strength of 100 V/m, and its magnetic field has an approximate strength of 0.25 to 0.65 gauss. Thus, given a network of sensors located just about the surface of the Earth, the response of the electric and magnetic fields should be essentially constant over a given area of the Earth's surface, as illustrated in FIG. 2 for electrical field E and magnetic field M (both at all frequencies within the range). These intensities may vary based on the frequency being measured, with lower (fundamental) frequencies typically having higher intensities and lower (harmonic) frequencies having lower intensities. The existence of subsurface objects and other anomalies will cause distortions in these electromagnetic fields due to differences in the electromagnetic properties of the subsurface object and its surroundings. Accordingly, both the electric and the magnetic components of the Earth's electromagnetic field can convey information that is useful for passively detecting relatively smaller scale (i.e., human-scale) subsurface objects and anomalies at relatively near-surface depths (i.e., less than 30 meters).

Electromagnetic waves abide by the same properties as other waves in nature. These include superposition and elimination, attenuation, as well as a host of others. Some properties, such as attenuation when traveling through mediums, are frequency based. The concept is known as skin effect, and can be described by Equation 1, as follows:

$$\delta = \sqrt{\frac{2\rho}{\omega\mu}} \sqrt{\sqrt{1+(\rho\omega\epsilon)^2}+\rho\omega\epsilon} \quad \text{Equation 1}$$

where $\delta$ is the skin depth, $\rho$ is the resistivity, $\omega$ is the angular frequency ($2\pi$*frequency of operation), $\epsilon$ is the total permittivity, and $\mu$ is the total permeability of the material.

By measuring electromagnetic signals emanating from the Earth at closely spaced locations just above the ground, it is possible to determine if and where a subsurface object, void, or other anomaly exists. The signal modification, be it by attenuation in magnitude or some other electromagnetic property, is most pronounced in close proximity to and directly above a subsurface object. This is a result of the general vertical direction in which the signal propagates and the refractive nature of the ground-air boundary at relatively low frequencies.

Figure 3:
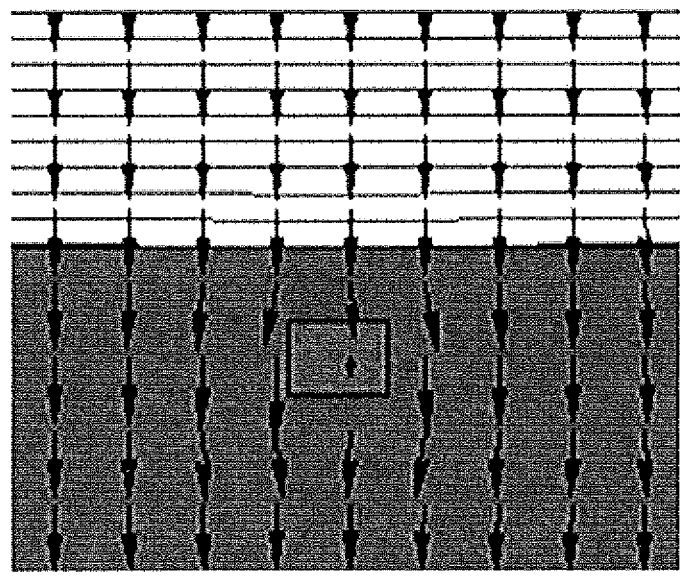
FIG. 3 illustrates an example of distortions of the Earth's electromagnetic field.
Figure 4:
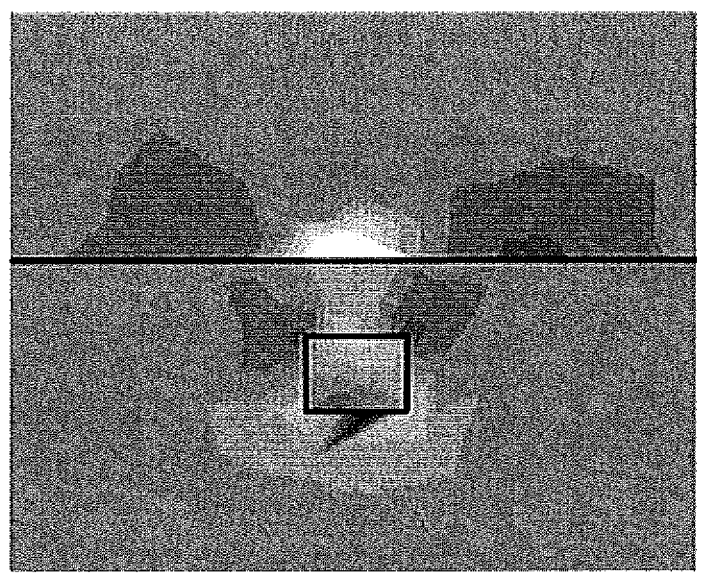
FIG. 4 illustrates a second example of distortions of the Earth's electromagnetic field.

Two examples of distortions of the electromagnetic field are illustrated in FIGS. 3 and 4. The source of the electromagnetic fields being distorted can be varied in origin. The electromagnetic environment may be composed of any number of varying field components, including but not limited to natural phenomena such as lighting strikes, the quasi-static earth-to-ionosphere potential and many other internal effects or man-made signals, such as those that are emanating from electric power lines, or electromagnetic fields deliberately created in the vicinity of the object with a signal generator, that could be used for sensing purposes. The distortions in these fields will be functions of frequency and location. The nature of the distortions will be foremost characterized by the differences in material properties between the subsurface object and its surroundings. The most influential of these properties include conductivity, dielectric permittivity, and magnetic permeability. These properties are, in turn, potentially affected by other properties, such as material porosity and moisture content. An apparatus with at least one, but preferably many, field probe(s) can sense such distortions in said fields. Suitable electromagnetic field probes can include transducers, such as electric field probes or magnetic pickup coils, among many other options. The signals sensed over an area may be recorded and processed with a computational device to estimate the location and nature of the subsurface object. In order for said field distortions to be measurable, the sensing probe should be in close proximity to the surface, and the object may not be located too deeply or too distant from the probes, and abide by good practice in collecting and recording electronic signals. Note that frequency dependent conductivity of the surrounding material may act as a sufficient shield and suppress distortions at certain frequencies.

Figure 5:
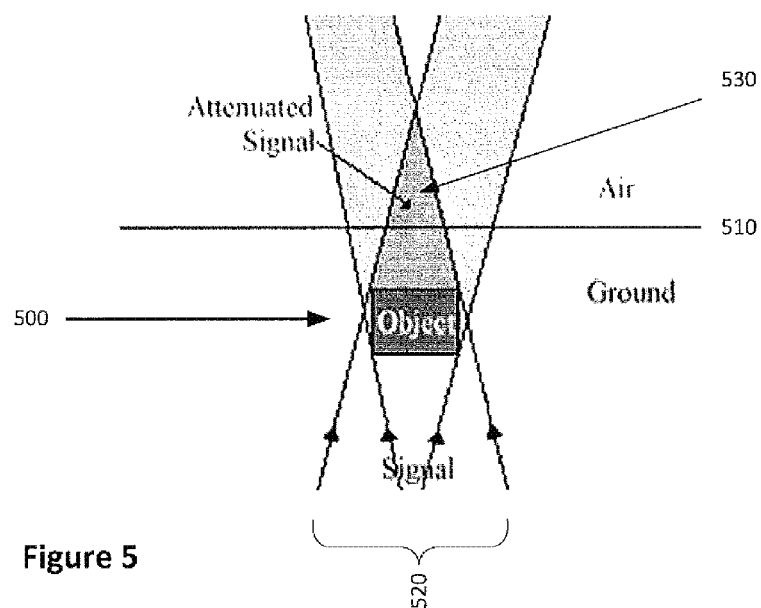
FIG. 5 illustrates how an object located below the air-ground barrier can distort components of the Earth's electromagnetic field.

FIG. 5 illustrates this general idea. Object 500 is located relatively near the Earth's surface, denoted by ground-air boundary 510 and in the field of composite signal 520 emanating from within the Earth. The presence of object 500 results in attenuation of composite signal 520 that is detectable above the surface of the Earth in area 530. Possible refraction of signal 520 about object 500 may create more complicated effects than the simple "shadowing" illustrated. A suitable sensor can be employed as described herein to detect the alteration in composite signal 520 resulting from the presence of object 500. The alterations will contrast measurements in regions where composite signal 520 has not been affected by the presence of object 500.

Figure 6:
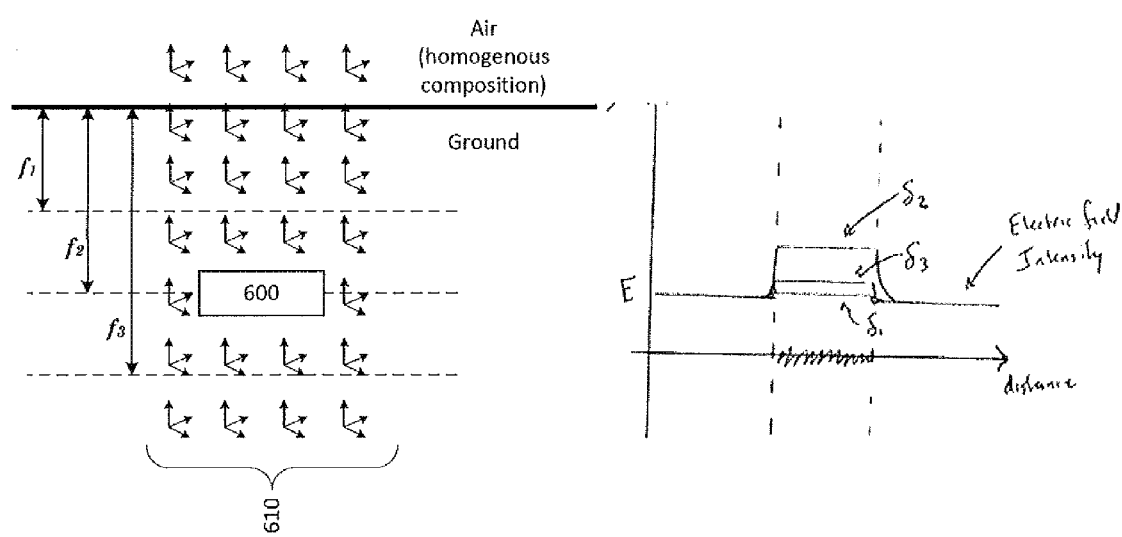
FIG. 6 illustrates the effects of an object located below the air-ground barrier on the electric component of the Earth's electromagnetic field at varying frequencies.

Based on the effective skin depth, or the depth of an anomaly, both the electric and magnetic field strength intensities can be detected by stimulating a range of frequencies. As illustrated in FIG. 6 with respect to the Earth's electric field, object 600 is located below the Earth's surface and within its electric field, shown as flux field 610. Measuring the intensity of electric field 610 for a range of frequencies $f_1$, $f_2$ and $f_3$ over a given distance or area, as shown in FIG. 6, the existence of object 600 causes a change in intensity for each of frequencies $f_1$, $f_2$ and $f_3$. The detectable changes in intensity are indicative of the presence of object 600. Moreover, because the change is greatest for frequency $f_2$, the depth of object 600 can be determined according to Equation 1, above. Thus, both the existence of object 600 and its depth can be ascertained by measuring the change in the intensity of electric field 610 over a distance. The same process also can be used to detect objects by measuring changes in the intensity of the Earth's naturally occurring magnetic field. Similarly, by knowing the distance above the surface traversed by the sensor probe and the depth of the object will provide s relative dimension for the anomaly.

Figure 7:
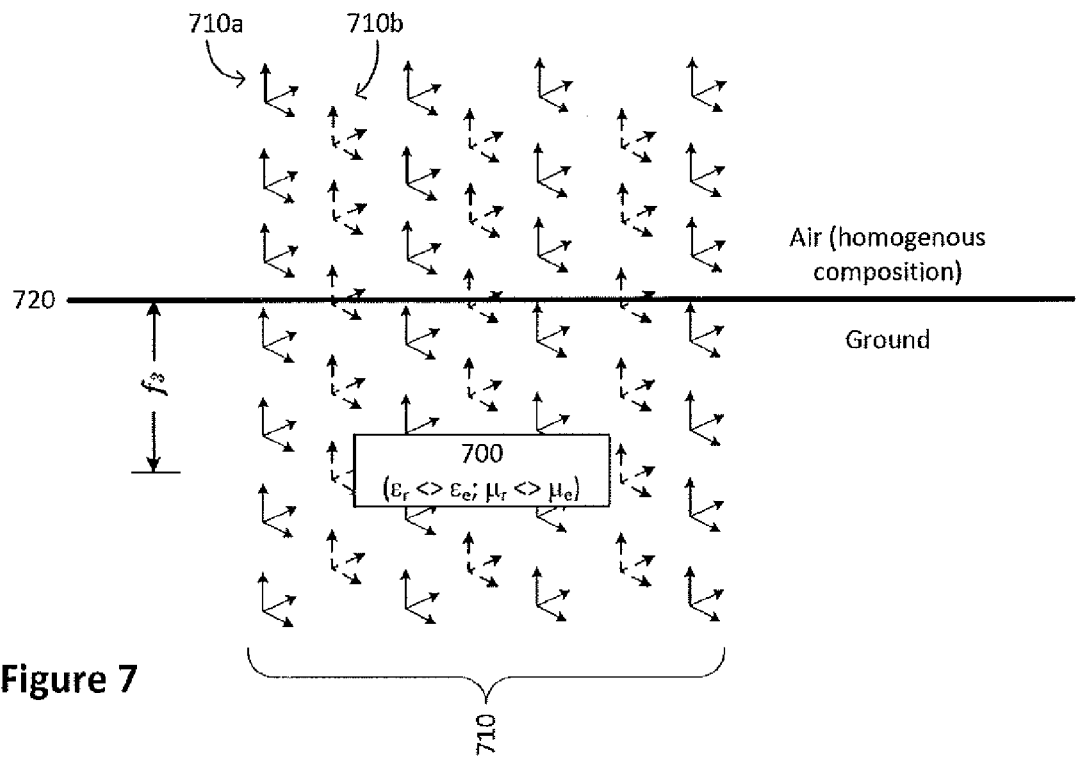
FIG. 7 illustrates the typical electric and magnetic fields radiating from the Earth in the presence of a non-magnetic anomaly.
Figure 8:
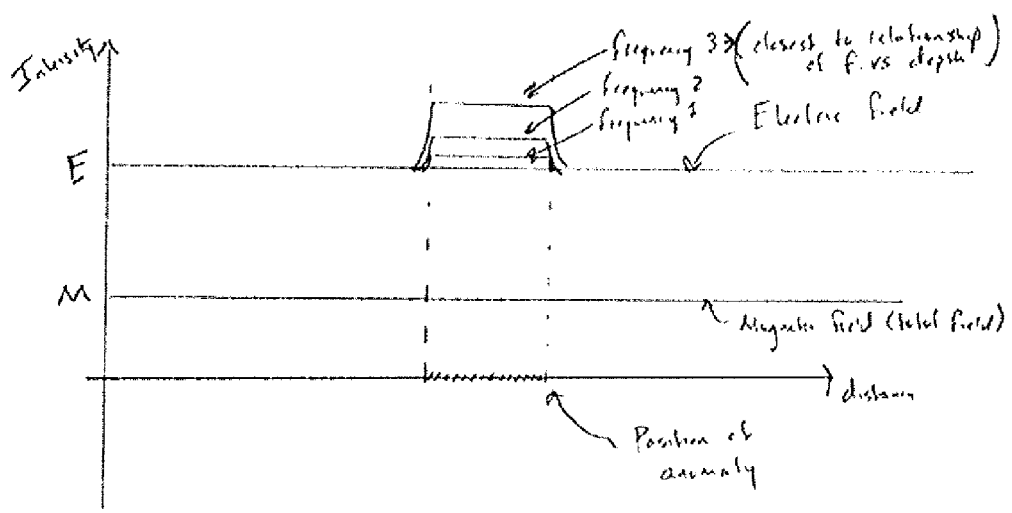
FIG. 8 illustrates the differences in intensity versus position for the electric and magnetic components of the typical electromagnetic field radiating from the Earth in the presence of a non-magnetic anomaly.

When a subsurface anomaly is present in the Earth, either or both of the electric and magnetic field components can change based on the material characteristics of the object. Consider, for example, non-magnetic anomaly 700 having a relative permittivity $\epsilon_r$ and relative permeability $\mu_r$ that differ from the permittivity $\epsilon_e$ and permeability $\mu_e$ of the Earth in the vicinity of the anomaly, as shown in FIG. 7. When electric component 710*a* of the Earth's electromagnetic field passes through non-magnetic object 700, the intensity of the electric field will change in the vicinity of the anomaly, usually as an increase in electric field strength. As discussed above, this change in electric potential E of electromagnetic field 710 can be measured over an area or distance, as shown in FIG. 8 for frequencies $f_1$, $f_2$ and $f_3$, with frequency $f_3$ having the closest relationship to the depth of non-magnetic object 700 below ground-air barrier 720. However, because there is no perturbation of magnetic component 710*b* of the Earth's electromagnetic field, there will be no measurable change in the intensity of magnetic field M as shown in FIG. 8 due to the presence of non-magnetic object 700.

Figure 9:
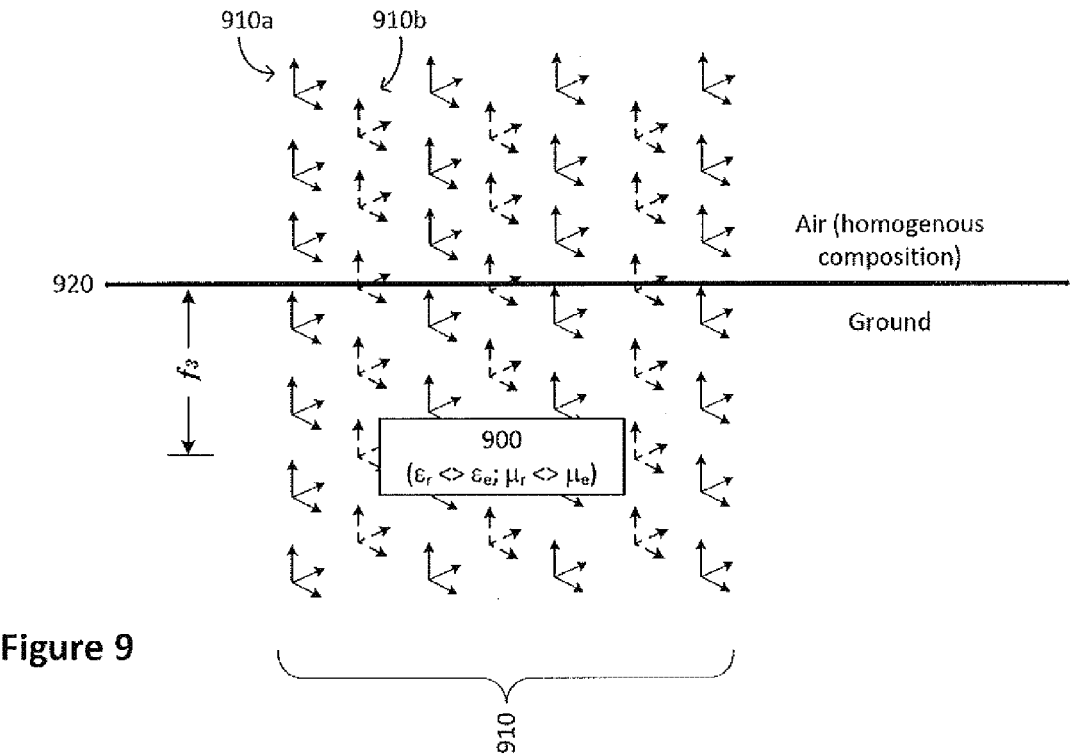
FIG. 9 illustrates the typical electric and magnetic fields radiating from the Earth in the presence of a magnetic anomaly.
Figure 10:
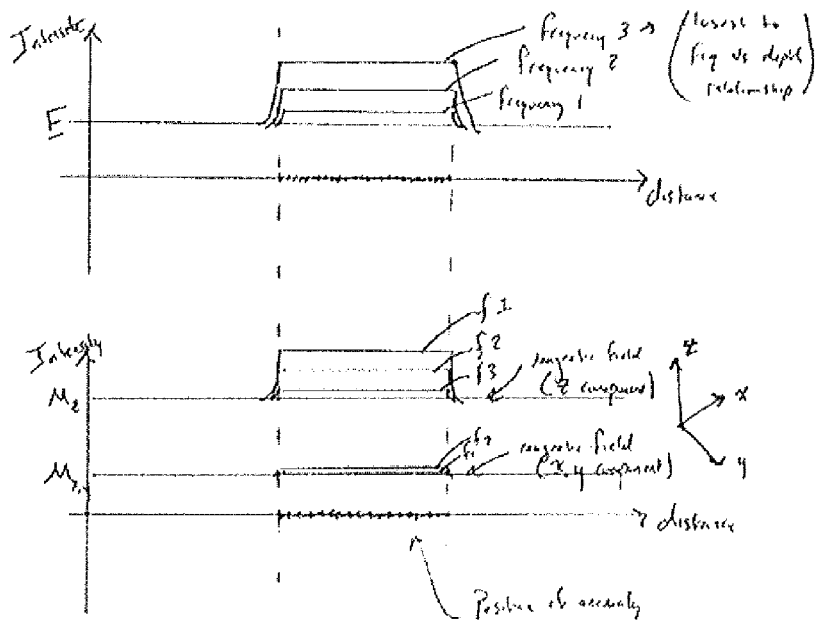
FIG. 10 illustrates the differences in intensity versus position for the electric and magnetic components of the typical electromagnetic field radiating from the Earth in the presence of a magnetic anomaly.

As a further example, the presence of a magnetic (paramagnetic to ferromagnetic in classification) anomaly with relative permittivity more than 1 and permeability more than 1 will cause variation with respect to both the electrical and magnetic components of the Earth's magnetic field. FIG. 9 shows the presence of magnetic object 900 having a relative permittivity $\epsilon_r$ and relative permeability $\mu_r$ that differ from the permittivity $\epsilon_e$ and permeability $\mu_e$ of the Earth in the vicinity of the anomaly within electromagnetic field 910. When electric field component 910a passes through magnetic object 900, the intensity of the electric field will change in the vicinity of the anomaly (again, usually, this is an increase in electric field strength). Additionally, the intensity of magnetic field component 910b of electromagnetic field 910 will change in the vicinity of the anomaly, with the change in magnetic potential increasing or decreasing based on the orientation of magnetic object 900 vis-à-vis magnetic component 910b of electromagnetic field 910. As shown in FIG. 10, both electric potential E and magnetic potential M change in intensity in proximity to magnetic object 900 at frequencies $f_1$, $f_2$ and $f_3$. Because the electrical field radiates radially, it remains the most useful for determining the depth of magnetic object 900. The depth of magnetic object 900 below ground-air barrier 920 thus can be ascertained based on frequency $f_3$ since it demonstrates the greatest change in intensity. Once the depth of the anomaly is discerned, the remaining electric and magnetic characteristics can be used to determine the most likely material composition (given a lookup table, or other suitable means for comparison, is available). Thus, by measuring the changes in both the electric and magnetic fields, a more accurate characterization can be performed regarding the composition, size and material structure of the buried subsurface anomaly.

Figure 11:
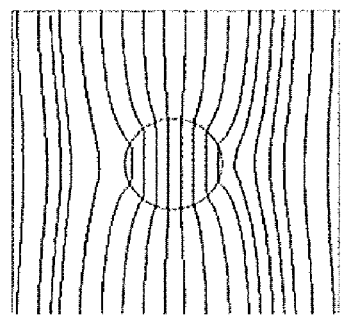
FIG. 11 illustrates distortions in the electric field caused by an object with a strong dielectric constant.

In one embodiment, a subsurface object may be detected through the distortions in the electric field caused by differences in properties of the subsurface object and its surroundings. An example of this type of distortions resulting from an object with a strong dielectric constant in a static electric field is illustrated in FIG. 11. This figure shows the electric field lines bending toward the region in space with higher dielectric property. In detecting subsurface objects, the static field lines may bend toward or away from the object depending on the material of the object compared to the surroundings. The nature and severity of the distortion will be foremost characterized by the differences in material properties between the subsurface object and its surroundings. Consequently, a passive detection method such as this one could be used to locate anomalies on top of each other (with some earth between them) as well. The material properties that are very influential on a static electric field include conductivity, and dielectric permittivity. These properties may, in turn, be affected by other properties, such as material porosity and moisture content.

An apparatus with at least one, but possibly many, sensors can detect and measure distortions in one or more components the electromagnetic field as a function of position. The position of each measurement may be determined by using a network of known positions with a triangulation scheme, including global positioning system, or other appropriate means. The signals sensed at various locations over an area and the location at which a signal is sensed may be recorded and processed with an appropriately-configured computational device to estimate the location and nature of the subsurface object.

For the field distortions to be measurable and to minimize the effects of potential sources of electromagnetic and other forms of interference, the sensing probe should be in close proximity to the surface. This is because the density of the field's flux lines tend to re-equalize at large relative distances from a given object and thus the distortions may no longer be detectable if the probes are far away. In one embodiment, non-geological scale objects having relative permittivity and permeability that differ from the permittivity and permeability of the Earth in the vicinity of the anomaly can be detected at near-surface depths at frequencies greater than 5 kHz, with the preferable frequencies being a function of relative permittivity, which can range from $\epsilon_r=1$ to 100,000, relative permeability, which can range from $\mu_r=1$ to 1,000,000, and the resistivity $\rho$ of the Earth, which typically is in the range of 10 to 1,000 Ohm-m and can vary up to 10 times higher and lower in extreme situations.

Figure 12:
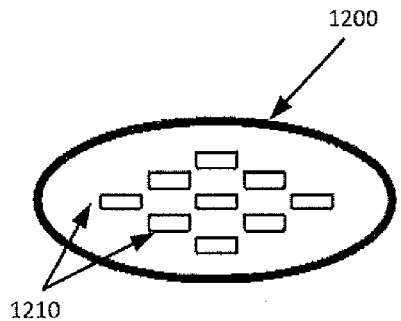
FIG. 12 illustrates an exemplary sensor configuration.

In one embodiment, the signal is electromagnetic in nature and is monitored over an area by several sensors. Monitoring the signal over a suitably sized area can be accomplished by mechanically scanning sensors over the area, or by having a multitude of sensors distributed in some suitable fashion over the region. FIG. 12 shows an exemplary sensor configuration 1200 comprising nine sensors 1210. Each sensor, or network of sensors, may include a suitable arrangement of electronics and transducers, such as electric field probes or magnetic pickup coils with appropriate amplification and conditioning electronics. Sensors also may include permalloy sensors, including sheets of such sensors. Other sensors capable of sensing electrical or magnetic fields with sufficient sensitivity may be used, as would be understood to one of ordinary skill in the art. Such sensors could be in a handheld device (i.e. a scanner or metal detector sized apparatus), attached to a rotorcraft (such as RC helicopters or quadcopters), or another portable apparatus.

The sensor signals are preferably recorded and processed by a computational device to extract the location of the subsurface object. The recording and processing is preferable done with a suitable computer and data acquisition system. The processing may involve computing differences in sensor responses as functions of sensor location, time the signal is measured, and frequency of the signal. In one embodiment, the processing only concentrates on an electromagnetic signal of low audio and sub-audio frequencies, since attenuation of electromagnetic signal strength during propagation rises with increased frequency. Results of the computation then may be displayed in some fashion so the subsurface object can be located. The display could be as complex as a two- or three-dimensional map of the area scanned or as simple as an indicator light that activates on the sensing apparatus when over the object.

In one embodiment, the sensor apparatus includes an array of probes, arranged spatially over an area in which distortions are to be measured. This arrangement may include a rectangular grid of probes, a hexagonal tiling, or some other regular or irregular arrangement. The probes themselves can be embodied by a plate, field sensing dipoles, coils, or other structures composed of a suitable material. The probes should be suspended in close proximity to the ground, and be oriented to measure at least the vertical electric field component. This field component should be particularly strong due to the relatively high conductivity of the ground compared to the air above. (Electric field lines orient themselves to impinge normally on "good" conductors.) If coils are employed, horizontal magnetic field components may be of greater interest. Other field components may be measured, as well, and additional information may be gained from measuring such field components.

The suspension of the probes in close proximity to the ground should be such as to not interfere with or obscure the field to be measured. The suspension framework thus should preferably be constructed of a material that has electrical properties as close to air as possible. For example, closed-cell extruded polystyrene foam and other hardened foamed materials have been found to possess reasonably suitable qualities.

Figure 13:
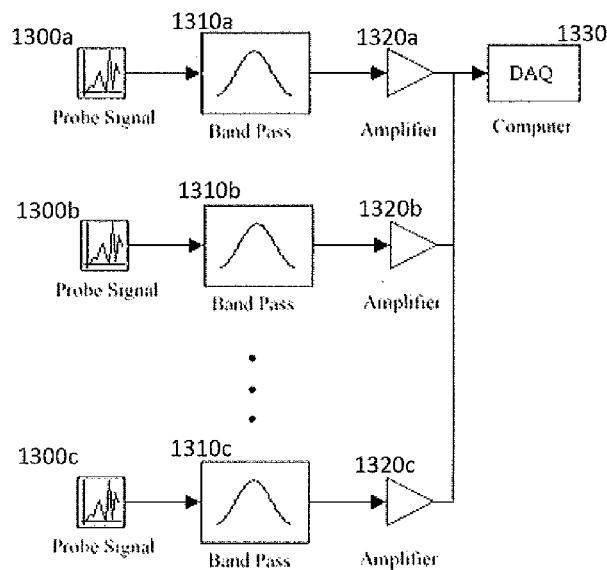
FIG. 13 illustrates an exemplary circuit for detecting the presence of a human-scale anomaly at a near-surface depth.

As shown in FIG. 13, the signal collected from each of probes 1300a-c may be passed through its own frequency selective circuit 1310a-c to reject signals not of interest prior to amplification of such signals by amplifiers 1320a-c. In one embodiment, frequency selective circuit 1310 a-c may include low noise band pass filters or selectively variable filters to prevent overloading of amplifiers 1320a-c by excessively strong undesired signals. After undesired signals are filtered or otherwise removed or otherwise addressed, each probe signal is amplified by amplifiers 1320a-c. Each probe signal preferably is amplified by its own high impedance instrumentation grade amplifier to recordable levels. The amplified signals are then transferred to a recording device 1330, where they can be stored, analyzed and interpreted. In one embodiment, the signal is digitized either before or after being transmitted or communicated to recording device 1330 and analyzed on a digital computer.

In one embodiment, each probe, frequency selective circuit, and amplifier is a small self-contained unit that links to the recording device, such as a computer, by a method that will not cause field distortions. A probe may include a small dipole antenna, an integrated circuit chip that performs frequency band selection and amplification, a miniature battery, and a fiberoptic interface that carries the amplified signal to the data recording device that has been prepared in such a manner as not to interfere with the signal to be measured. For example, the device could include of an electromagnetic interference (EMI) shielded laptop computer. Shielding may be accomplished by placing the recording device in a steel box at some distance from the sensing probes or in other ways that will be appreciated by those of ordinary skill in the art.

In one embodiment, all probe signals are recorded simultaneously (in parallel) to remove the time varing randomness in the electromagnetic fields used for sensing. The signals are then processed, preferably by a computer with appropriate software, or some alternate mechanism. The processing may include calculating one or more metrics to extract signal differences from probe-to-probe. Calculating a metric could, for example, include decomposing the recorded signals into their frequency components (spectral analysis) and then comparing probe to probe variations at various frequencies. If multiple field components are measured, techniques such as principal component analysis could also be used to determine the orientations of the largest field differences.

Comparing probes, spaced farther apart in the array, as opposed to probes located adjacent, may allow relative depth probing. As discussed above with respect to Equation 1, a relative correlation exists between depth and frequency, since electromagnetic field penetration into a conductive medium will decrease with increasing frequency (i.e., the skin effect).

Figure 14:
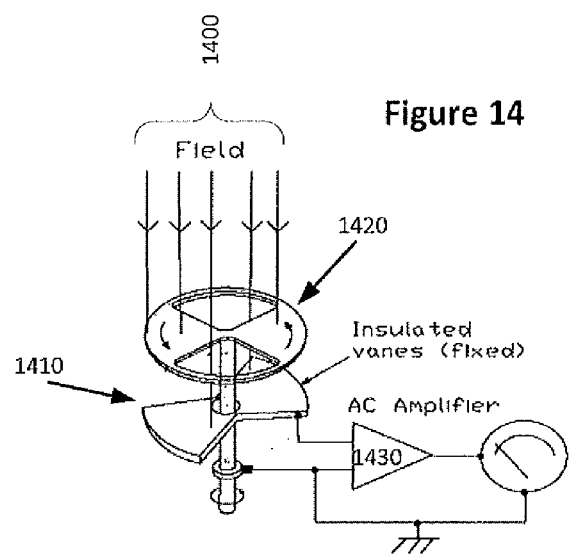
FIG. 14 illustrates a field mill sensor for measuring components of the Earth's electromagnetic field.

In an embodiment, the sensor apparatus includes a stationary reference static electric field sensor, and one or more static field sensors that can mechanically scan over an area. The stationary field sensor's signal is used as a reference, to compare to other sensor readings. The mechanical scanning may be accomplished with a suitable x-y scanning mechanism. A field sensor may include a device such as an electric field mill as shown in FIG. 14, a field effect transistor with an appropriate probe, or some other device that can properly sense the presence and orientation of a static electric field. In FIG. 8, the field mill measures electric field 1400 using fixed electrodes 1410 that are alternately shielded and exposed to field 1400 by spinning rotor 1420, resulting in a modulation of induced electrical charge. Charge amplifier 1430 can then convert the modulated charge into voltages proportional to the strength of field 1400 that can then be measured by volt meter 1440. The electric field sensors should be suspended in close proximity to the ground, and in one embodiment, are oriented to measure the vertical electric field. The electric field on the surface of the Earth is oriented vertically due to the relatively high conductivity of the ground with respect to the air directly above, as electric field lines orient themselves to impinge normally on "good" conductors. The field thus may be thought of as a charged parallel plate capacitor, where the Earth and the ionosphere comprise the plates of the capacitor, and the electric field exists between the two. Mounting the sensors close above the ground should be such as to not interfere with the measurement of the static electric field.

Once the electric field component or other signals have been recorded as, for example, a function of position over the area as, for example, a digitized signal on a computer or microprocessor, they can be analyzed by suitable means to reveal distortions that indicate subsurface objects, voids, or other anomalies. The results can then be displayed. In one embodiment, the results may be displayed as 2- or 3-dimensional estimations of a subsurface object or its location, or as simple as an indicator light signaling the presence of a subsurface object. Recognition and classification techniques may be employed to further improve the usefulness of the results for a given objective. For example, anomalies that meet certain criteria may be indicated in a manner that is different from other areas, such as highlighting an area with characteristics consistent with a possible landmine or underground utility pipe, where as other subsurface objects such as rocks may be ignored or shown in other colors or representations.

Various embodiments of the invention have been described above. Modifications, alterations, and/or combinations of the embodiments presented will occur to others upon the reading and understanding of this specification. The claims as follows are intended to include all modifications, alterations, and/or combinations insofar as they come within the scope of the claims or the equivalents thereof.

What is claimed is:

1. A computer-implemented method for detecting a subsurface anomaly at a near-surface depth, comprising the steps of:

positioning an electromagnetic sensor that is configured to measure a component of a planetary electromagnetic field such that the electromagnetic sensor is suspended just above a ground-air barrier and does not contact a ground surface;

selecting an electromagnetic frequency by calculating, with a computing device, a function of properties of the ground that include relative permittivity, relative permeability, and resistivity;

moving the electromagnetic sensor over the surface of the ground;

repeatedly measuring intensity of the component of the planetary electromagnetic field at the frequency to obtain a set of measurements; and comparing, with the computing device, at least a first measurement in the set of measurements to at least a second measurement in the set of measurements to identify a change in the intensity of the component of the planetary electromagnetic field that is indicative of a presence of a subsurface anomaly.

2. The method of claim 1, wherein the selected frequency is at least 5 kilohertz (kHz).

3. The method of claim 2, wherein the subsurface anomaly is human-scale.

4. A computer-implemented method for determining depth of a subsurface anomaly at a near-surface depth, comprising the steps of:

positioning an electromagnetic sensor that is configured to measure a component of a planetary electromagnetic field such that the electromagnetic sensor is suspended just above a ground-air barrier and does not contact a ground surface;

selecting a first electromagnetic frequency by calculating, with a computing device, a function of properties of the ground that include relative permittivity, relative permeability, and resistivity;

selecting a second electromagnetic frequency by calculating, with a computing device, a function of properties of the ground that include relative permittivity, relative permeability, and resistivity;

moving the electromagnetic sensor over the surface of the ground;

repeatedly measuring intensity of the component of the planetary electromagnetic field at each of the first frequency and the second frequency to obtain a set of measurements;

determining, with the computing device, which of the first electromagnetic frequency and the second electromagnetic frequency exhibits a greater change in intensity attributable to the subsurface anomaly; and calculating, with the computing device, a depth of the subsurface anomaly;

wherein calculating the depth is based at least in part on measured intensity, at the electromagnetic frequency determined to exhibit the greater change in intensity, of the component of the planetary field.

5. The method of claim 4, wherein the first electromagnetic frequency and the second electromagnetic frequency are each at least 5 kHz.

6. The method of claim 5, wherein the subsurface anomaly is human-scale.

* * * * *